US011117435B2

(12) United States Patent
Liebold et al.

(10) Patent No.: US 11,117,435 B2
(45) Date of Patent: Sep. 14, 2021

(54) DAMPING MODULE FOR TWO DAMPING DEVICES ON TWO WHEEL CARRIERS OF AN AXLE OF A VEHICLE

(71) Applicant: Dr. Ing. h.c. F. Porsche Aktiengesellschaft, Stuttgart (DE)

(72) Inventors: Jochen Liebold, Stuttgart (DE); Markus Eisenbarth, Stuttgart (DE); Thomas Witte, Ditzingen-Heimerdingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 56 days.

(21) Appl. No.: 16/821,025

(22) Filed: Mar. 17, 2020

(65) Prior Publication Data
US 2020/0298647 A1 Sep. 24, 2020

(30) Foreign Application Priority Data
Mar. 21, 2019 (DE) ..................... 10 2019 107 218.2

(51) Int. Cl.
*B60G 17/016* (2006.01)
*B60G 17/08* (2006.01)
*B60G 13/08* (2006.01)

(52) U.S. Cl.
CPC ............. *B60G 17/08* (2013.01); *B60G 13/08* (2013.01); *B60G 2202/24* (2013.01); *B60G 2202/416* (2013.01); *B60G 2500/02* (2013.01); *B60G 2500/10* (2013.01); *B60G 2500/30* (2013.01); *B60G 2800/162* (2013.01)

(58) Field of Classification Search
CPC .... B60G 17/08; B60G 13/08; B60G 2202/24; B60G 2202/416; B60G 2500/02; B60G 2500/10; B60G 2500/30; B60G 2800/162
USPC ..... 280/124.157, 124.158, 124.159, 124.161
See application file for complete search history.

(56) References Cited

U.S. PATENT DOCUMENTS

| 5,042,834 A * | 8/1991 | Yonekawa ........... B60G 17/016 |
| | | 280/5.514 |
| 2005/0230888 A1* | 10/2005 | Karlsson ................ B60G 21/06 |
| | | 267/64.27 |

(Continued)

FOREIGN PATENT DOCUMENTS

DE 3427508 A1 2/1986

*Primary Examiner* — Toan C To
(74) *Attorney, Agent, or Firm* — RatnerPrestia

(57) ABSTRACT

A damping module for two damping devices on two wheel carriers of an axle of a vehicle, having a first damping circuit with a first upper damping connection to an upper damping chamber of a first damping device and a first lower damping connection to a lower damping chamber of the first damping device. A first pump device is arranged in a first pumping connection between the first upper damping connection and the first lower damping connection. Two valve combinations are oriented in opposite directions and include, in each case, a nonreturn valve (RV) and an adjustable throttle valve (DV) arranged in a first compensating connection. A second damping circuit with a second upper damping connection to an upper damping chamber of a second damping device and a second lower damping connection to a lower damping chamber of the second damping device are provided.

9 Claims, 2 Drawing Sheets

(56) References Cited

U.S. PATENT DOCUMENTS

Figure 1:
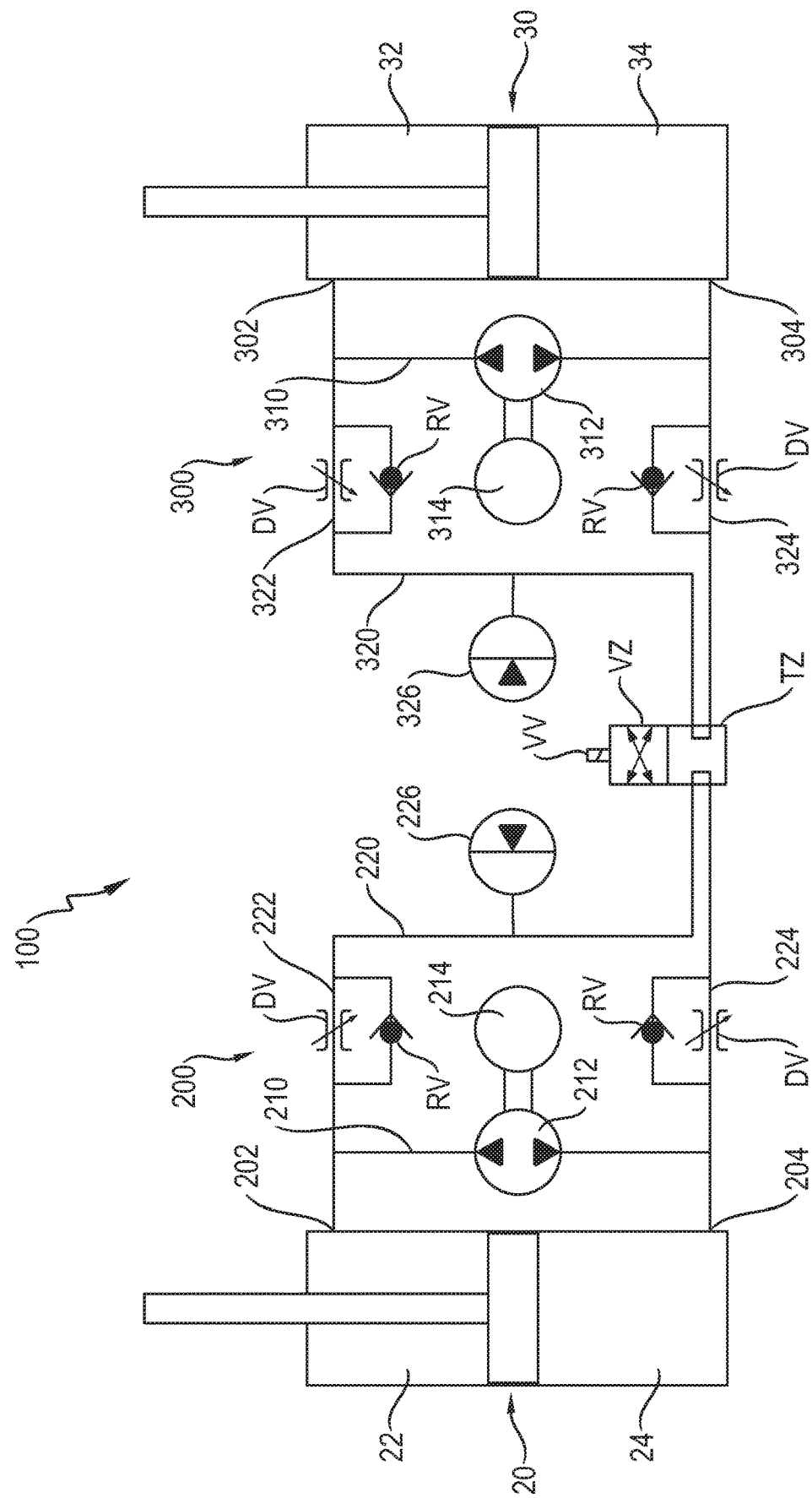

| | | | |
|---|---|---|---|
| 2009/0138157 A1* | 5/2009 | Hagglund | B60G 17/0162 |
| | | | 701/38 |
| 2014/0232082 A1* | 8/2014 | Oshita | B60G 17/08 |
| | | | 280/124.161 |
| 2017/0240019 A1 | 8/2017 | Six et al. | |
| 2017/0305226 A1* | 10/2017 | Okimura | B60G 17/056 |
| 2017/0313153 A1* | 11/2017 | Masamura | B60G 17/056 |
| 2017/0320368 A1* | 11/2017 | Masamura | B60G 17/0165 |
| 2018/0326810 A1* | 11/2018 | Masamura | B60G 17/0164 |
| 2019/0084366 A1* | 3/2019 | Birch | B60G 17/015 |
| 2020/0049266 A1* | 2/2020 | Tucker | F16K 15/186 |
| 2021/0197639 A1* | 7/2021 | Bauer | B60G 17/0565 |

\* cited by examiner

DAMPING MODULE FOR TWO DAMPING DEVICES ON TWO WHEEL CARRIERS OF AN AXLE OF A VEHICLE

CROSS-REFERENCE TO RELATED APPLICATION

This application claims priority to German Patent Application No. 10 2019 107 218.2, filed Mar. 21, 2019, the content of such application being incorporated by reference herein in its entirety.

FIELD OF THE INVENTION

The present invention relates to a damping module for two damping devices on two wheel carriers of an axle of a vehicle and to a method for operating such a damping module.

BACKGROUND OF THE INVENTION

It is known that vehicles have damping devices in order to avoid an undesirably rapid compression or extension of an associated spring device on the respective wheel carrier of the axle. The damping devices are conventionally arranged combined directly with the corresponding spring device on the wheel carrier of the respective axle of the vehicle. The combination of damping devices and spring devices serves for a damped compression and a damped extension when the respective wheel of the vehicle travels through a depression or travels over a bump. However, in addition to the primary spring and damper task, a weight shifting due to centrifugal forces may also bring about a compression and an extension. This is the situation in particular when traveling around corners, during accelerations or during braking situations. "Rolling" of the vehicle is mentioned here in travel around corners. In a right-hand curve, the vehicle is inclined to the left due to the centrifugal force, that is to say the spring devices and the damping devices on the left side of the vehicle compress. Accordingly, during a left-hand curve, this happens on the right outer curve side of the vehicle. The respectively opposite spring devices and damping devices are increased in length and accordingly extend.

In order to reduce the above-described rolling, known vehicles have separate stabilizers which, for example, provide a separate transmission of force between the two sides of the vehicle during travel through a corner. Torsion rods or other separate active compensating devices are also known. It is also known for the damping circuits of the individual damping devices of the individual wheel carriers to be connected passively to one another in order to ensure compensation of damping fluid between the different damping chambers of the the damping device.

It is disadvantageous in the known solutions that a high outlay on cost and a high outlay on installation has to be expended for separate active rolling stabilizers. Furthermore, an additional construction space in the vehicle for the separate components is necessary in the known solutions. The previously known passive solutions for damping devices do not permit any active influencing, but rather are limited in respect of structural configuration to a predefined manner of operation for the roll stabilization. In particular a combination with a pitch stabilization for severe acceleration situations is possible here with difficulty, if at all.

SUMMARY OF THE INVENTION

In view of the foregoing it would be desirable to reduce the energy requirement of the active chassis and to realize this in an optimum manner in terms of construction space.

Further features and details of the invention will emerge from the dependent claims, the description and the drawings. Features and details which are described in conjunction with the damping module according to aspects of the invention also apply, of course, in conjunction with the method according to aspects of the invention and vice versa in each case, and therefore reference is or can be made constantly from one to the other in respect of the disclosure of the individual aspects of the invention.

According to aspects of the invention, a damping module is formed for two damping devices on two wheel carriers of an axle of a vehicle. For this purpose, the damping module has two different damping circuits, namely a first damping circuit and a second damping circuit. The two damping circuits are preferably formed identically or substantially identically.

The first damping circuit has a first upper damping connection to an upper damping chamber of a first damping device and a first lower damping connection to a lower damping chamber of the first damping device. In the same manner, the second damping circuit has a second upper damping connection to an upper damping chamber of a second damping device and a second lower damping connection to a lower damping chamber of the second damping device. Furthermore, in the first damping circuit, a first pumping connection with a first pump device is arranged between the first upper damping connection and the first lower damping connection. A first compensating connection having two compensating combinations which are oriented in opposite directions and consist in each case of a nonreturn valve and an adjustable throttle valve is located parallel to said first pumping connection. Similarly, also in the second damping circuit, a second pumping connection with a second pump device is arranged between the second upper damping connection and the second lower damping connection. A second compensating connection having two compensating combinations which are oriented in opposite directions and consist in each case of a nonreturn valve and an adjustable throttle valve is located in the second damping circuit parallel to said second pumping connection.

Furthermore, the first damping circuit and the second damping circuit are connected to each other via a connecting valve which, in a separating state, separates the two damping circuits from each other and, in a connecting state, connects the two damping circuits to each other.

According to aspects of the invention, a separate damping circuit is now provided for each damping device. Each of said two damping circuits is provided with classic damping functionality via the respective compensating combination. The opposed orientation of the compensating combinations consisting of nonreturn valve and adjustable throttle valve result in the tension state and the compression stage for the respective damping device being able to be set separately from each other. If the piston in a damping device therefore moves downward into the lower damping chamber, damping fluid is correspondingly pressed out of the lower damping chamber via one of the two compensating combinations into the upper damping chamber. During the reverse movement, the upper damping chamber is reduced in size and therefore damping fluid is now pushed from there in a fluid-communicating manner back into the lower damping chamber via the other compensating combination because of the opposed orientation. By means of the adjustment or by means of the variation of the respective throttle valve, the throttle effect and therefore the movement speed of the piston in the described movement directions and also the damper force can be changed independently of one another for the two above-described fluid paths. The same applies of course to the two damping circuits and therefore also to the two connected damping devices.

A first core concept of the present invention now resides in the fact that each of the two damping circuits has a dedicated pump device. The latter is arranged in each case in a first or second pumping connection in parallel to the first or second compensating connection and can be operated with a drive, explained further on. As soon as the pump device is set into operation, it supports or prevents, depending on the direction of rotation, the above-described fluid communication between the lower damping chamber and the upper damping chamber. This can take place both in a state of movement of the piston in the respective damping device and also if the piston in the damping device does not carry out its own movement. The respective pump device can therefore make it easier or make it more difficult for the piston to move in the described manner. If the pump device is directed in the same direction as the flow direction of the damping fluid during a movement of the piston in the associated damping device, a greater flow or more damping fluid is transported at the same time into the opposite damping chamber of the damping device. At the same time, the piston can therefore move more easily and therefore more rapidly or by a further distance. If, by contrast, the pump device is operated in the opposite manner, the movement of the piston within the damping device is prevented, and therefore the damping path is reduced and the movement speed is likewise reduced. Of course, the respective pumping device can also be driven in the unmoved state of the piston, and therefore an active changing of the damping force becomes possible here without said damping device being influenced from the outside, for example by the movement of the vehicle. Thus, for example, when the pump device is used simultaneously for different damping devices, a height offset, a switching on of the vehicle or else, however, a lateral inclination of the vehicle may be possible. Of course, a purely regulated or controlled stabilization can thereby also be carried out in an active manner for the vehicle since an active controlled or regulated and therefore monitored adaptation of the damping situation for the respective damping circuit becomes possible by means of the respective pump device.

According to aspects of the invention, the two damping circuits are additionally connectable to each other if the connecting valve switches from the separating state into the connecting state. In the connecting state, a cross wire connection is preferably provided, and therefore, in this case, the known passive compensating possibility can be provided for roll stabilization. In such a case, the manner of operation of the two pump devices is preferably configured in such a way that they only maintain and do not change the pressure in the respective damping circuit. Of course, however, said passive roll stabilization can additionally also be supported with the operation of at least one of the two pump devices and therefore reinforced or reduced.

As becomes clear from the above explanation of the manner of operation, by means of the combination of passive roll stabilization and the active engagement possibility of the two pump devices arranged separately from each other, a high degree of variability and flexibility can be provided for stabilizing the vehicle. The vehicle can thus be stabilized for very different situations cost-effectively and easily. In particular, this active control or regulation is integrated or can be integrated in the respective damping circuit and therefore in existing damping devices of the vehicle. In addition, the energy requirement is reduced in comparison to a solution without connection of the dampers of an axle. One advantage of the use of the connecting valve is that no additional compensating tanks are necessary for realizing the passive or active roll stabilization.

The present invention also relates of course to a corresponding axle of a vehicle with two such damping devices which are connected to each other via the described damping module. Of course, a plurality of axles or a plurality of wheel carriers of a vehicle can also have a corresponding combination of one or more damping modules.

It can be of advantage if, in a damping module according to aspects of the invention, the connecting valve in the connecting state connects the two damping circuits crosswise. This means therefore that, in the connecting state, the lower damping chamber of the second damping device is connected in a fluid-communicating manner to the upper damping chamber of the first damping device and, conversely, the lower damping chamber of the first damping device is connected in a fluid-communicating manner to the upper damping chamber of the second damping device. The corresponding opposed orientation of the compensating combinations is likewise switched crosswise via the crosswise connection. The known passive roll stabilization can therefore be provided, in particular if the two pumping devices are operated in such a case in order to retain the pressure in the respective damping circuit.

It is furthermore of advantage if the connecting valve has at least two different connecting states, wherein, in one connecting state, the two damping circuits are crosswise and, in another connecting state, the two damping circuits are separated. In addition to known 4/2 valves, other types of valves are, of course, also conceivable.

Advantages can likewise be afforded if, in the case of a damping module according to aspects of the invention, the first pump device has a first drive and the second pump device has a second drive which is separate from the first pump device. The two drives are in particular electric motors. By means of the separate configuration of the two drives, a particularly simple and independent influencing of the respective damping circuit can be provided. Of course, however, in principle a common drive with a corresponding transmission solution would also be conceivable in order to be able to form the desired separate influencing by separate transmission connections to a common drive. However, the formation of two separate drives avoids such a transmission solution and in particular also complicated and costly mechanical couplings.

Furthermore, it is advantageous if, in the case of a damping module according to aspects of the invention, a first compensating tank for damping fluid is arranged in the first damping circuit, in particular in the first compensating connection, and a second compensating tank for damping fluid is arranged in the second damping circuit, in particular in the second compensating connection. For different temperature situations there is a different expansion situation for the respective damping fluid. Since in particular incompressible liquid damping fluids are used, the thermal expansion of the damping fluid can be compensated for by the respective compensating tank. Owing to the fact that the piston within the respective damping device is conventionally connected to a piston rod which likewise dips into the damping fluid or leaves the damping fluid again during the opposite movement, the volume compensation is additionally also provided here for displacing the piston rod in the respective compensating tank.

Furthermore, it is of advantage if, in the case of a damping module according to aspects of the invention, the first pump device and the second pump device are identical or at least one of the following features of the two pump devices is identical:

Pumping capacity
Response behavior
Design.

The above enumeration is not a definitive list. The use of identical or substantially identical pump devices firstly increases the number of identical parts of the overall system and thereby reduces the costs. The same control logic can also activate all of the pump devices of the damping module.

It is furthermore advantageous if, in the case of a damping module according to aspects of the invention, the first pump device and/or the second pump device are designed to be self-locking. This can be provided, for example, by a forcibly conveying configuration of the respective pump device. The corresponding pump impeller can therefore be kept in the self-locking position under load by a small amount of energization, and therefore a passive solution, as it were, is thereby formed. As soon as a higher energization provides a greater power at the respective pump device, active influencing is possible by conveying the damping fluid. The corresponding power for the holding is lower than when, in the active state, the damping fluid actually has to be conveyed with the respective pump device.

A further advantage can be obtained if, in the case of a damping module according to aspects of the invention, the two damping circuits are arranged in a common damping unit. One such common damping unit can be preassembled modularly and therefore reduces the outlay on installation. The damping unit itself thereby has the two damping connections of the first damping circuit and the two damping connections of the second damping circuit, and therefore the respective damping device as a purely passive damper is formed cost-effectively and in a small size and can be mounted easily and rapidly.

The present invention likewise relates to a method for operating a damping module according to aspects of the invention, wherein, in the connecting state of the connecting valve, the first pump device and the second pump device are at least partially operated in order to maintain the pressure in the two damping circuits. Despite the active engagement possibility of the pump devices, passive roll stabilization can therefore be simulated as it were. In the separating state, it is advantageous if, in the case of the first pumping device and the second pumping device, an operation is provided independently of each other in order to change the pressure in the respective damping circuit. Said individual operation can provide roll stabilization and/or pitch stabilization actively in a controlled, regulated and/or monitored manner.

Further advantages, features and details of the invention emerge from the description below in which exemplary embodiments of the invention are described in detail with reference to the drawings. The features mentioned in the claims and in the description may be essential to the invention in each case individually by themselves or in any combination.

BRIEF DESCRIPTION OF THE DRAWING FIGURES

Figure 2:
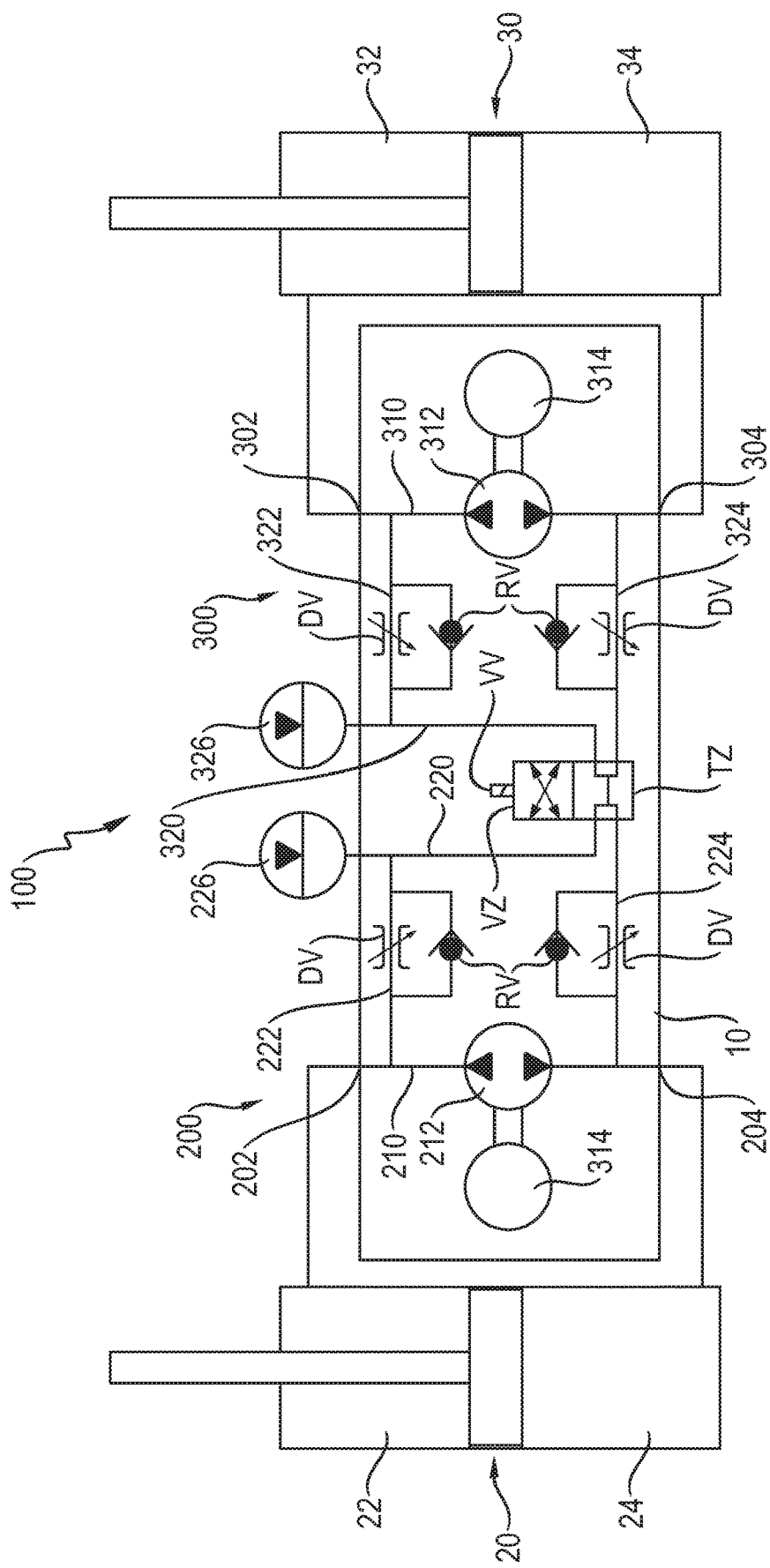

Schematically in the drawings:

FIG. 1 shows a first embodiment of a damping module according to aspects of the invention, FIG. 2 shows a further embodiment of a damping module according to aspects of the invention.

DETAILED DESCRIPTION OF THE INVENTION

FIGS. 1 and 2 show various embodiments of a damping module 100 according to aspects of the invention which all have identical or similar ways of operation. For the sake of clarity and in order to avoid repetitions, the manner of operation will now be explained in more detail with respect to FIG. 1.

FIG. 1 illustrates two damping devices 20 and 30. Each of said two damping devices 20 and 30 is provided with an upper damping chamber 22 or 32 and a lower damping chamber 24 or 34. Furthermore, a piston which can move upward and downward is located in the respective damping devices 20 and 30, and therefore the respective damping chambers 22, 24, 32 and 34 are accordingly changed.

The damping devices 20 and 30 are filled with damping fluid in order to provide the damping function. A first damping circuit 200 is provided in the known manner using the example of the first damping device 20. In the same manner, a second damping circuit 300 is provided at the second damping device 30. The first damping circuit 200 is equipped with a first compensating connection 220 which, in FIG. 1, leads back again to the first damping device 20 via the connecting valve VV in the separating state TZ. Two valve combinations 222 and 224 are arranged in this first compensating connection 220. The valve combinations 222 and 224 consist of a nonreturn valve RV and an adjustable throttle valve DV which are arranged parallel to each other. If, therefore, using the example of the first damping device 20, damping fluid flows from the first lower damping chamber 24 via the first lower damping connection 204 into the first damping circuit 200 by means of a movement of the piston from the top downward, said damping fluid flows through the adjustable throttle valve DV of the lower compensating combination 324 and through the nonreturn valve RV of the upper first compensating combination 322 in order thereby to penetrate into the upper damping chamber 22 of the first damping device 20 via the first upper damping connection 202. During a reverse movement of the piston of the first damping device 20, the reverse damping flow takes place. In the same manner, there is also the connection in the second damping circuit 300 of the second damping device 30 with the corresponding compensating combinations 322 and 324 and of course also with the two compensating tanks 326 and 226.

As soon as active influencing is desired, during such a movement or else without any movement, a drive 214 or 314 can operate the respective pump device 212 or 312 in associated pumping connections 210 or 310 in order thereby to produce an additional or reduced fluid volumetric flow through the adjustable throttle valves. An active movement of the respective piston in the respective damping device 20 or 30 is thereby also possible. As soon as the connecting valve VV switches over into a connecting state VZ according to FIG. 1, a crosswise connection of the two damping circuits 200 and 300 is provided, in which passive roll stabilization can be provided in a known manner. In this position, passive operation, i.e. holding of the two pump devices 212 and 312, is provided. Alternatively, in the active operation, the energy requirement can be reduced in comparison to a solution without connection of the dampers of an axle. One advantage of the use of the connecting valve is that no additional compensating tanks are necessary for realizing the passive or active roll stabilization.

FIG. 2 is based on the embodiment of FIG. 1, wherein all of the active construction units of the damping module, in particular all of the details of the two damping circuits 200 and 100 are provided in a common damping unit 10, in particular within a common housing. Simple, cost-effective, compact and, above all, passive damping devices 20 and 30 are now connected via the corresponding damping connections 202, 204, 302 and 304.

The above explanation of the embodiments describes the present invention exclusively within the scope of examples. Of course, individual features of the embodiments, if technically expedient, can be freely combined with one another without departing from the scope of the present invention.

The basic concept of the present invention is, firstly, the depicted connection of the dampers so that the compensating volume can act as a hydropneumatic store and the energy requirement can be reduced. Secondly, by moving all of the components into a central valve block, construction space is saved at the damper.

What is claimed:

1. A damping module (100) for two damping devices (20, 30) on two wheel carriers of an axle of a vehicle, said damping module comprising:
    a first damping circuit (200) comprising a first upper damping connection (202) to an upper damping chamber (22) of a first damping device, (20) a first lower damping connection (204) to a lower damping chamber (24) of the first damping device (20), a first pump device (212) arranged in a first pumping connection (210) between the first upper damping connection (202) and the first lower damping connection (204), and two valve combinations (222, 224) which are oriented in opposite directions and each include a nonreturn valve (RV) and an adjustable throttle valve (DV) arranged in a first compensating connection (220),
    a second damping circuit (300) comprising a second upper damping connection (302) to an upper damping chamber (32) of a second damping device (30), a second lower damping connection (304) to a lower damping chamber (34) of the second damping device (30), a second pump device (312) arranged in a second pumping connection (310) between the second upper damping connection (32) and the second lower damping connection (34), two compensating combinations (322, 324) which are oriented in opposite directions and each includes a nonreturn valve (RV) and a variable throttle valve (DV) arranged in a second compensating connection (320), and
    a connecting valve (VV) arranged between the first damping circuit (200) and the second damping circuit (300), the connecting valve (VV) configured to separate the two damping circuits (200, 300) in a separating state (TZ) and connect the two damping circuits (200, 300) in a connecting state (VZ).

2. The damping module as claimed in claim 1, wherein the connecting valve (VV) in the connecting state (VZ) connects the two damping circuits (200, 300) crosswise.

3. The damping module as claimed in claim 1, wherein the first pump device (212) has a first drive (214) and the second pump device (312) has a second drive (314) which is separate from the first pump device (212).

4. The damping module as claimed in claim 1, further comprising a first compensating tank (226) for damping fluid that is arranged in the first compensating connection (220), and a second compensating tank (326) for damping fluid is arranged in the second compensating connection (320).

5. The damping module as claimed in claim 1, wherein the first pump device (212) and the second pump device (312) are either identical or at least one of the following features of the two pump devices (212, 312) is identical: Pumping capacity, Response behavior; and Design.

6. The damping module as claimed in claim 1, wherein the first pump device (212) and/or the second pump device (312) have/has a phase short circuit.

7. The damping module as claimed in claim 1, wherein the two damping circuits (200, 300) are arranged in a common damping unit (10).

8. In a damping module (100) for two damping devices (20, 30) on two wheel carriers of an axle of a vehicle, said damping module including:
    a first damping circuit (200) comprising a first upper damping connection (202) to an upper damping chamber (22) of a first damping device, (20) a first lower damping connection (204) to a lower damping chamber (24) of the first damping device (20), a first pump device (212) arranged in a first pumping connection (210) between the first upper damping connection (202) and the first lower damping connection (204), and two valve combinations (222, 224) which are oriented in opposite directions and each include a nonreturn valve (RV) and an adjustable throttle valve (DV) arranged in a first compensating connection (220),
    a second damping circuit (300) comprising a second upper damping connection (302) to an upper damping chamber (32) of a second damping device (30), a second lower damping connection (304) to a lower damping chamber (34) of the second damping device (30), a second pump device (312) arranged in a second pumping connection (310) between the second upper damping connection (32) and the second lower damping connection (34), two compensating combinations (322, 324) which are oriented in opposite directions and each includes a nonreturn valve (RV) and a variable throttle valve (DV) arranged in a second compensating connection (320), and
    a connecting valve (VV) arranged between the first damping circuit (200) and the second damping circuit (300), the connecting valve (VV) configured to separate the two damping circuits (200, 300) in a separating state (TZ) and connect the two damping circuits (200, 300) in a connecting state (VZ),
    a method for operating the damping module (100) comprises at least temporarily operating the first pump device (212) and the second pump device (312) in the connecting state (VZ) of the connecting valve (VV) in order to maintain or build up the pressure in the two damping circuits (200, 300).

9. The method as claimed in claim 8, further comprising independently operating the first pump device (212) and the second pump device (312) in the separating state (TZ) of the connecting valve (VV) in order to change the pressure in the respective damping circuit (200, 300).

* * * * *